Nov. 4, 1952
J. C. VELTMAN ET AL
2,616,383
APPARATUS FOR ALIGNING AND HOLDING
TYPE BLOCKS FOR SOLDERING
Filed Sept. 6, 1946
4 Sheets-Sheet 2
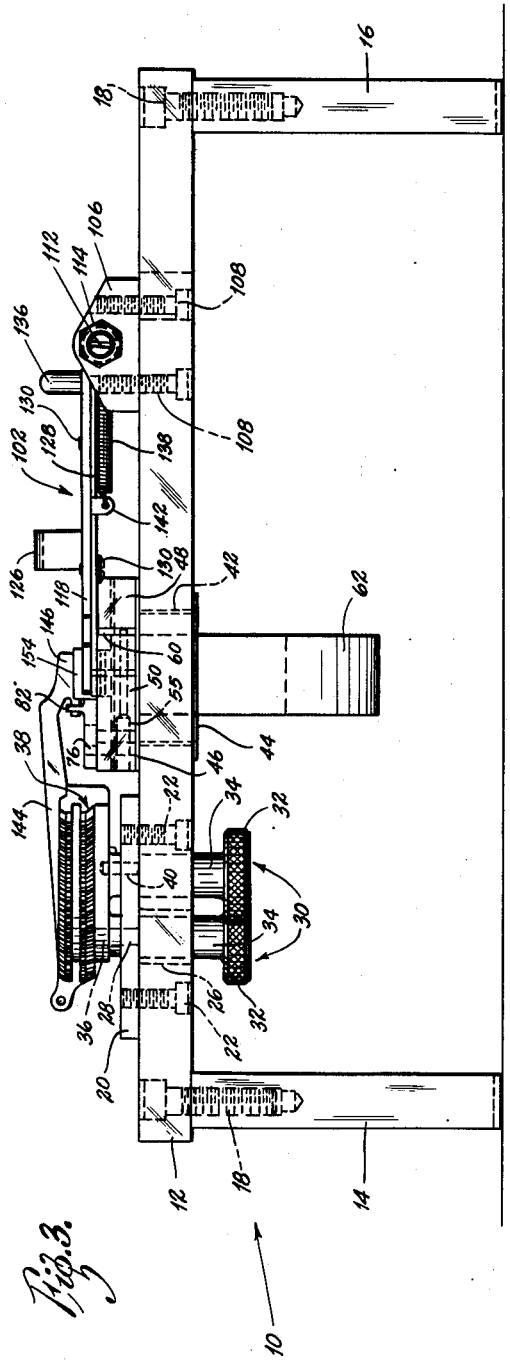
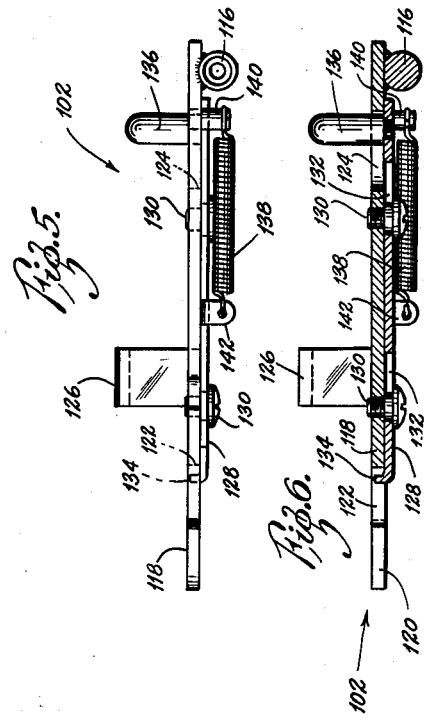
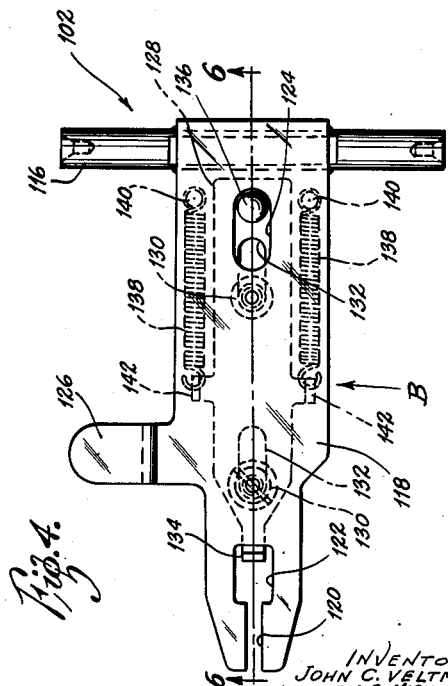
INVENTORS:
JOHN C. VELTMAN,
WILLIAM O. MICHELSEN
BY Kingsland, Rogers & Ezell
ATTORNEYS

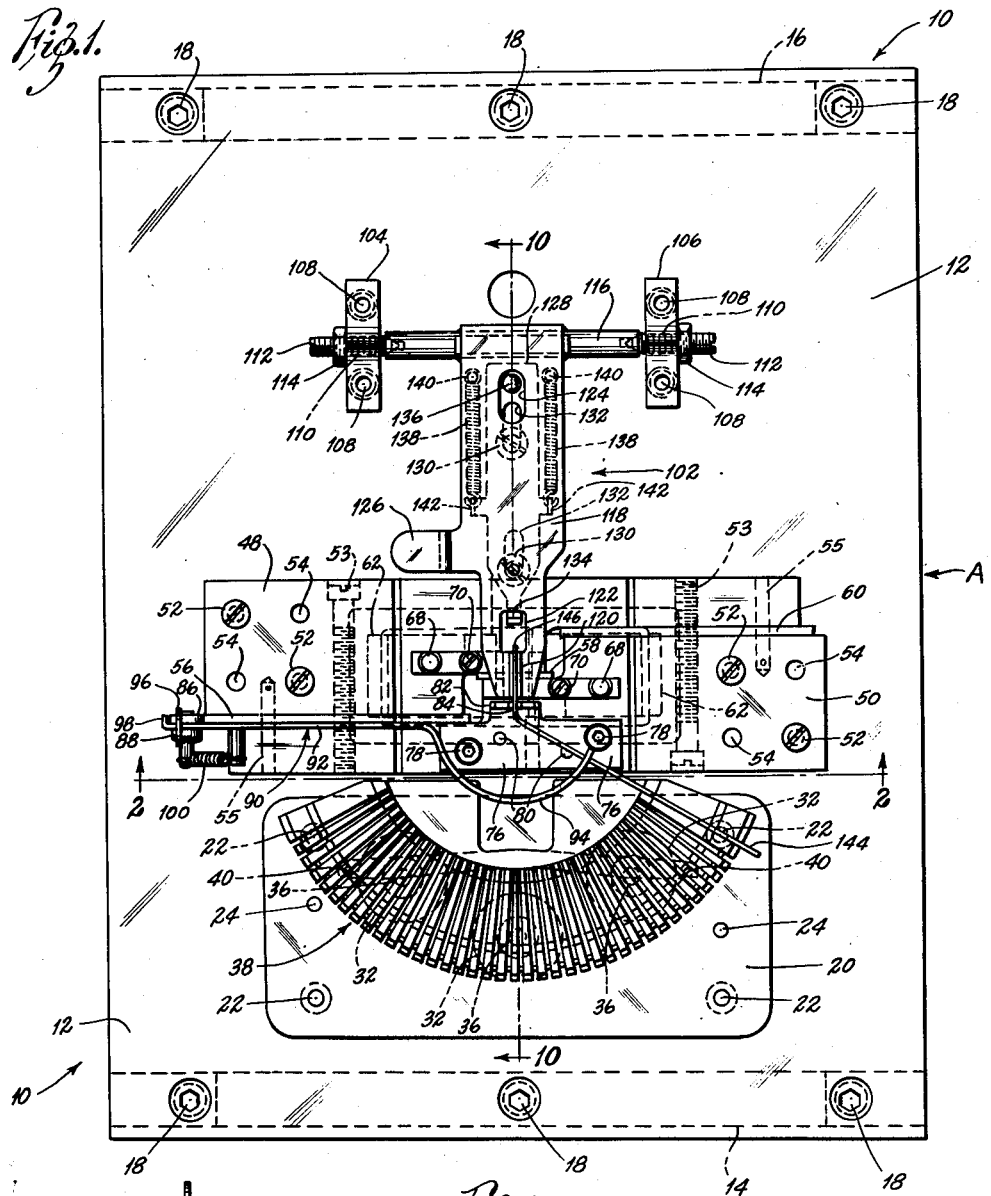

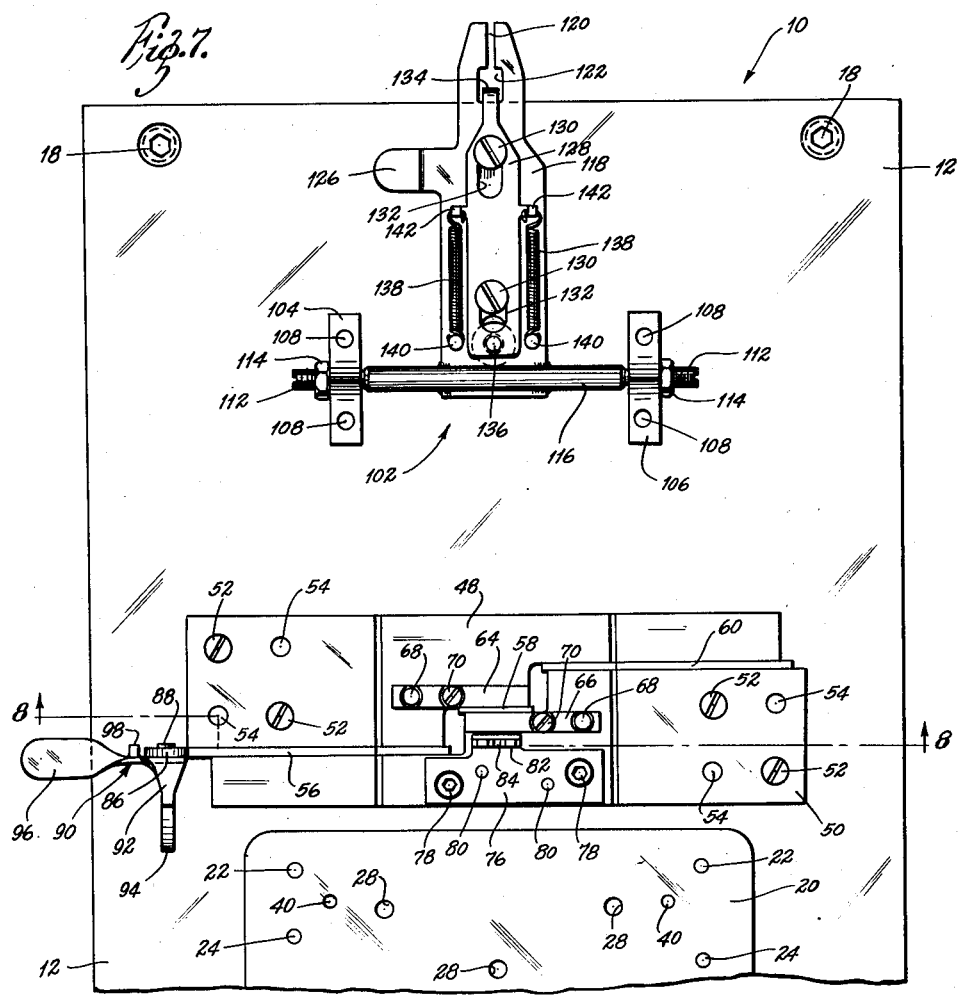
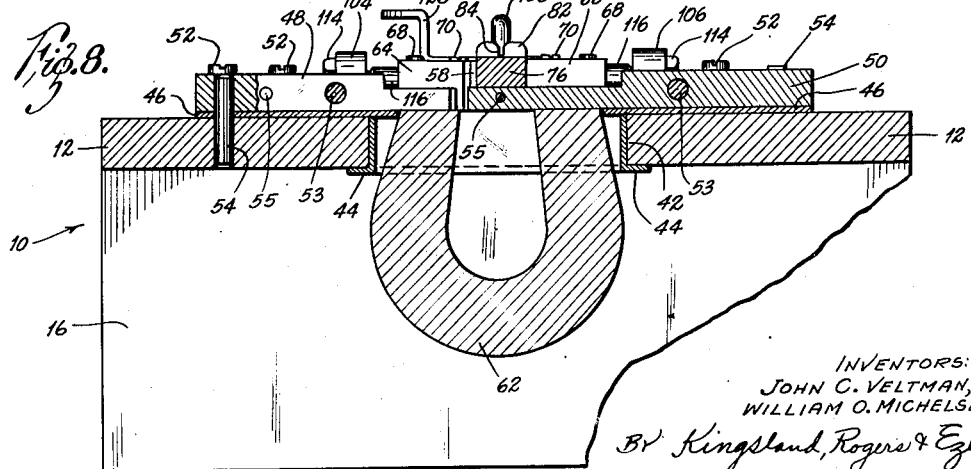

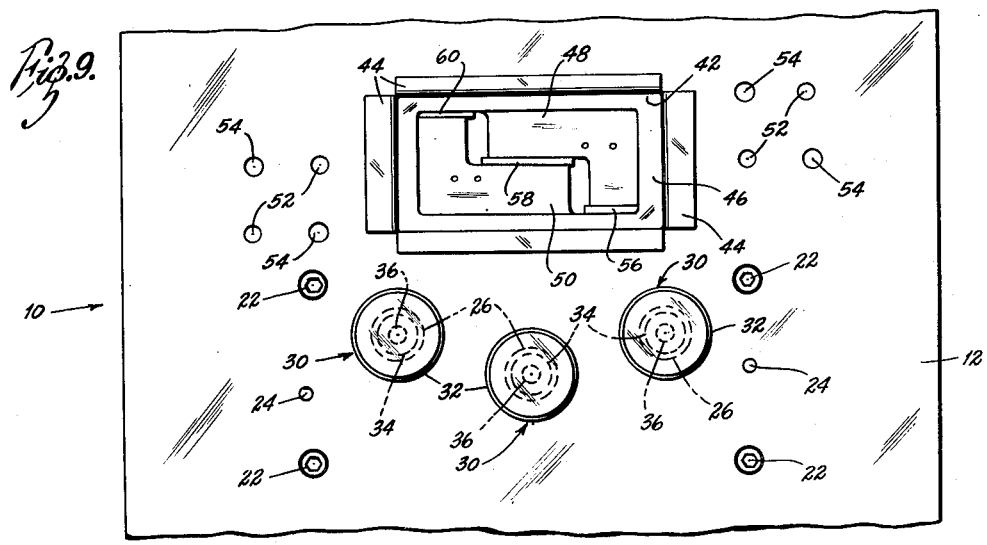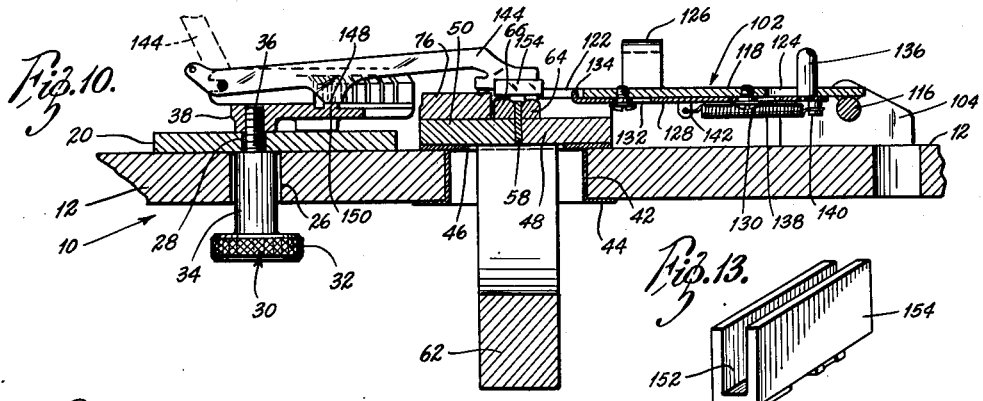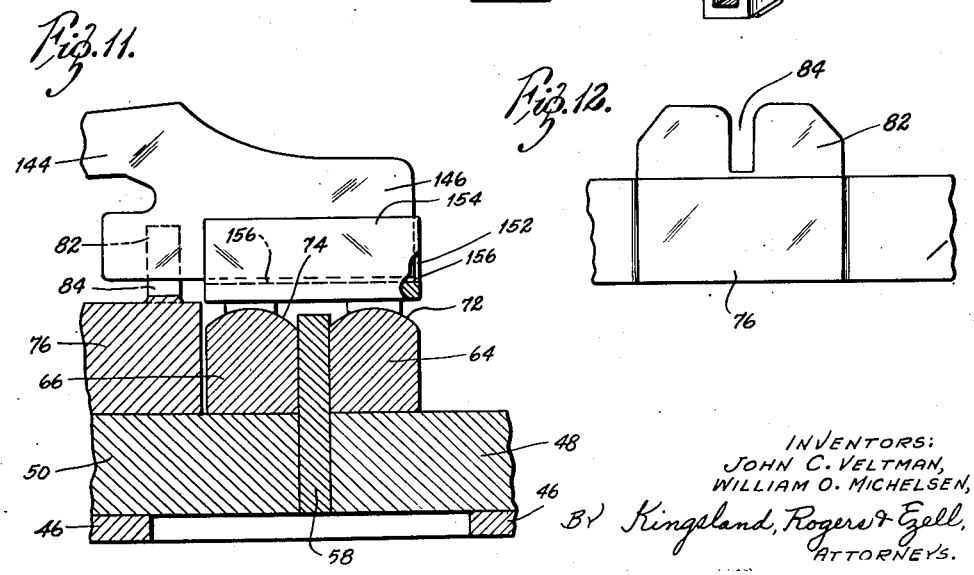

Patented Nov. 4, 1952

2,616,383

UNITED STATES PATENT OFFICE 2,616,383

APPARATUS FOR ALIGNING AND HOLDING TYPE BLOCKS FOR SOLDERING

John C. Veltman and William O. Michelsen, St. Louis County, Mo., assignors to The Emerson Electric Manufacturing Company, St. Louis, Mo., a corporation of Missouri Application September 6, 1946, Serial No. 695,146

6 Claims. (Cl. 113—99)

The present invention relates generally to the typewriter art, and more particularly to a device for and a method of aligning and soldering type.

Heretofore, there has existed in the typewriter art the problem of efficiently and accurately soldering type blocks to type bars to eliminate hand aligning, a time consuming operation, after the soldering step is completed. It is essential that the bars, with their type blocks, be ultimately accurately aligned in the finished typewriter in order to produce a straight writing line on the typewritten sheet, to space each character the proper distance from adjacent characters, and to secure simultaneous contact of the type on the paper and the type bar on the segment ring in order to prevent blurring of the imprint. Each type block, with its particular characters, must be located in a position on its type bar so that, as each type bar is actuated to printing position by depression of a key, the imprint on the paper at a common point is in proper relation to every other type block. A tolerance of only plus or minus two thousandths of an inch (±.002″) is allowed. Although many methods of type aligning and soldering have been tried on as many devices, none has achieved the success factor in respect to subsequent hand aligning which has long been sought.

The present invention is a solution to the long standing problem and achieves efficient and accurate type aligning, reducing to a negligible percentage the number of type bars with their type blocks which must be hand aligned.

An object of the present invention is to provide a novel type aligning and soldering device which so efficiently and accurately aligns the type block and associated type bar for soldering that the percentage of hand alignments required thereafterwards is negligible.

Another object is to provide a novel method of aligning and soldering type blocks to type bars which is accurate to the point of reducing to a negligible percentage the number of assembled units that require hand aligning after completion of the operation.

Another object is to provide a novel type aligning and soldering device which is adapted to receive a segment assembly including the pivoted type bars and by which type blocks, with their respective characters, are accurately soldered to the type bars so that a straight writing line, an unblurred imprint, and proper spacing of characters obtain in respect to a typewritten sheet after the segment assembly is mounted in a typewriter frame in proper relation to the other elements of the typewriter.

Another object is to provide a novel type aligning and soldering device by which type blocks are accurately located and firmly held in a position to receive a type bar for soldering thereto.

Another object is to provide a novel type aligning and soldering device by which a plurality of segment assemblies may be completed to include soldered type blocks with the type blocks of the several assemblies disposed in the same relation to each other.

Another object is to provide a novel method of aligning and soldering type blocks to type bars, which may be readily followed by an operator with production of high quality workmanship.

Other objects are to provide a novel type aligning and soldering device which is simple and compact in construction, which is inexpensive to make, which is long lasting in operation, which is positive in action, which may be readily handled by the operator, and from which high quality workmanship may be achieved with a minimum of instruction.

The foregoing and other objects and advantages are apparent from the following description taken with the accompanying drawings, in which:

Fig. 1 is a plan view of a type aligning and soldering device constructed in accordance with the teachings of the present invention, a type bar segment with a single type bar being shown thereon;

Fig. 2 is a fragmentary vertical sectional view taken on the line 2—2 of Fig. 1;

Fig. 3 is a side elevational view, looking in the direction of the arrow A shown in Fig. 1;

Fig. 4 is an enlarged top plan view of the type locating plate assembly;

Fig. 5 is a side elevational view of the type locating plate assembly, looking in the direction of the arrow B of Fig. 4;

Fig. 6 is a vertical cross-sectional view taken on the line 6—6 of Fig. 4;

Fig. 7 is a plan view of the device similar to Fig. 1, but with the aligning device and type bar hold-down lever in inoperative position and the type bar segment omitted;

Fig. 8 is a vertical transverse cross-sectional view on the line 8—8 of Fig. 7;

Fig. 9 is a fragmentary bottom plan view, showing the central position of the device, the magnet being omitted;

Fig. 10 is a fragmentary vertical longitudinal cross-sectional view on the line 10—10 of Fig. 1;

Fig. 11 is an enlarged fragmentary vertical cross-sectional view on the line 10—10 of Fig. 1 showing the relationship of the type block and type block supports;

Fig. 12 is an enlarged fragmentary elevational view of the type bar guide block showing the slotted flange; and Fig. 13 is an enlarged isometric view of a type block.

Referring to the drawings more particularly by reference numerals, 10 indicates generally a type aligning and soldering device constructed in accordance with the concepts of the present invention. The device 10 includes a base plate 12 of steel, or the like, of rectangular configuration mounted at the ends on side plates 14 and 16, being secured thereto by bolts 18. The base plate 12 supports the elements of the device 10.

At one end of the plate 12 is a small rectangular type segment mounting plate 20, which is secured thereto by suitable screws 22 and dowels 24. In the base plate 12 beneath the small plate 20 are three spaced circular apertures 26. Concentric with each of the apertures 26 is a small aperture 28 extending through the plate 20. A securing thumb screw 30 having a knurled head 32, an enlarged elongated base portion 34, and a threaded reduced extension 36 fits in each of the apertures 26 with the free shoulder portion of the elongated base portion 34 abutting the underside of the plate 20 and the threaded reduced portion 36 extending through the aperture 28 to engage a threaded bore in a mounted type segment 38. A pair of segment centering dowels 40 is provided, each dowel 40 extending into an aperture in the plate 20 to abut the upper surface of the base plate 12 and into prepared apertures in the segment 38.

A rectangular opening 42 is provided in the plate 12 spaced a short distance from the plate 20 which extends transversely of the base plate 12. A sheath 44 of brass, or other substantially nonmagnetic material, lines the four walls of the aperture 42 and overlaps the lower edges thereof. A thin plate 46 of nonmagnetic material surrounds the opening 42 and extends to a substantial distance beyond the edges thereof. Two magnet plates 48 and 50 of iron, or other magnetic material, and of the configuration shown in the drawings are mounted on the plate 46, each being secured thereon and to the base plate 12 by a pair of screws 52 and a pair of dowels 54, both the screws 52 and the dowels 54 extending well into the base plate 12. Additional screws 53 and dowels 55 draw the plates 48 and 50 together. The members 48 and 50 are of the same configuration, and are insulated from each other by nonmagnetic strips 56, 58 and 60. A permanent magnet 62 extends through the opening 42 and has its poles contacting the magnet plates 48 and 50, as is clearly shown in the drawings (Fig. 8).

On the magnet plates 48 and 50 there are mounted type support blocks 64 and 66, respectively, each being anchored by a dowel 68 and a screw 70. The type block receiving surfaces 72 and 74 of the support blocks 64 and 66, respectively, are convex (Fig. 11) and are of the same radius as the radius of the concave surface of the characters formed on the type blocks supported thereby. The surface 72 is curved to receive the upper case characters and the surface 74 to receive the lower case characters of supported type blocks. A type bar guide block 76 is mounted on the magnetic plate 50 by screws 78 and dowels 80. The guide block 76 includes an upstanding flange 82 having a central slot 84 which is adapted to receive the type block receiving head of a type bar. The type bar guide block 76 is disposed intermediate the plate 20 and the type support blocks 64 and 66, as is clearly shown in the drawings.

The strip 56 includes an upstanding post portion 86 which pivotally supports on a screw pivot 88 a bell crank lever 90, one arm 92 of which terminates in a portion 94 formed as the arc of a circle, the other arm 96 being formed as a thumb piece for pivoting the bell crank 90. A stop tab 98, formed integral with the arm 96, limits pivotal movement of the bell crank lever 90 counterclockwise (Fig. 2) by contacting the edge of the post portion 86. A spring 100 biases the bell crank 90 clockwise when in lowered position and counterclockwise when in raised position, the stop 98 being positioned to permit the bell crank 90 to swing the spring 100 past the screw pivot 88 in raising movement.

An aligning device 102 is mounted on the plate 12 in spaced relation to the above-mentioned elements of the present invention. A pair of spaced blocks 104 and 106 is secured to the plate 12 by suitable screws 108. Each block 104 and 106 has a threaded transverse aperture 110 which receives setscrews 112 which are locked in selected adjusted position by nuts 114. Conical free ends of the setscrews 112 pivotally receive the hollow ends of a shaft 116. A type block locating plate 118 is welded, or otherwise secured, to the shaft 116. At its free end, the plate 118 includes a slot 120 of a width slightly greater than the width of a type block. Rearwardly of the slot 120 is an enlarged opening 122, and near the mounting axis of the plate 118 is an aperture 124. Formed integral with the plate 118 is a thumb piece 126. A slide 128 is mounted beneath the plate 118 for longitudinal movement in respect thereto on screws 130 which extend through spaced slots 132 in the slide 128. At one end of the slide 128 is an upwardly turned tip 134 which extends into the opening 122 of the plate 118. A post 136 threadedly engages the rear of the slide 128 and extends through the opening 124, the post 136 serving as an operating handle for the slide 128. Two springs 138 are anchored to spring posts 140 mounted in the plate 118 and to downwardly turned tabs 142 formed integral with the slide 128. The springs 138 bias the slide 128 away from the slot 120.

*Operation*

The type segment 38 with a full set of type bars 144 (less type blocks) pivotally mounted thereon in the usual manner, and each type bar having a stop 148 adapted to strike the segment stop ring 150, is secured to the plate 20 by means of the thumb screws 30 after alignment by the dowels 40. For clarity of illustration, only one type bar 144 is shown in the drawings. The locating plate 118 is lowered into engaging position with the blocks 64 and 66. A selected type block 154 having a rear slot 152 is disposed in the slot 120 of the locating plate 118 and across the type support blocks 64 and 66 with the upper case character resting on the former and the lower case character resting on the latter, and is magnetically drawn thereagainst by a force strongly resisting removal yet permitting sliding movement for alignment. The type block 154 bridges the poles of the magnet 62, the character directly contacting the magnetized surfaces 72 and 74 throughout their full outlines to gain maximum holding effect. Thereupon, the post 136 is moved forwardly from its position of rest to engage the tip 134 with the outer end of the type block 154 to slide the other end thereof snugly against the base of the flange 82 formed integral with the type bar guide block 76. The post 136 is released and the spring 138 returns the slide 128 to its position of rest.

A selected type bar 144 is pivoted until the head 146 is disposed in the slot 152 of the type block 154. In this position the stop 148 of the type bar 144 abuts the stop ring 150 of the segment 38 and the head 146 is spaced from the bottom of the slot 152 of the type block 154 to provide a space 156 adapted to receive solder. Preferably, the free outer end edge of the head 146 is spaced slightly inwardly of the outer end edge of the type block 154 to receive solder for rounding the combined free end into a pleasing appearance (Fig. 11).

Pivoting of the selected type bar 144 should direct the head 146 into the slot 152 with the stop 148 engaging the stop ring 150, failing which, the type bar 144 is adjusted by means of a suitable tool until the foregoing specified fitting requirements obtain. Should adjustment of the type bar 144 be necessary, the slide 128 should be moved home against the type block 154 again to insure longitudinal alignment. Thereupon the bell crank lever 90 is pivoted clockwise so that the arcuate portion 94 of the arm 92 engages the top edge of the positioned type bar 144. The locking plate 118 is raised to inoperative position. Solder is then applied in the well known manner in the space 156 between the head 146 and the type block 154 and at the free ends thereof to securely engage the latter with the former. The soldered parts are chilled, the bell crank lever 90 is raised, and the type bar 144 with its now soldered type block 154 is flipped back to raised position with the other type bars. The process is repeated until all of the type bars 144 have their respective type blocks 154 soldered thereto.

After the segment assembly 38 is completed, it is removed by unthreading the thumb screws 30. The segment assembly 38 is ready for mounting in a typewriter. Inasmuch as each type bar and type block unit is accurately aligned at the time of soldering and all units are formed in the same manner, substantially no hand aligning is required after the segment assembly 38 is mounted in a typewriter. Additional segment assemblies are completed with true alignment of the type bars with their type blocks in the same manner as above described.

It is apparent that the present novel method of aligning and soldering type blocks to type bars and the present novel aligning and solder apparatus achieve the objects and ends sought. By the present method and apparatus, hand alignment of the type bar with type block after assembly is substantially eliminated, since each type block is soldered to its supporting type bar while in the same relationship as every other type block and type bar. The convex surfaces 64 and 66 both accurately relate a received type block 154 to the segment 38 and provide a full magnetic gripping surface to hold the received type block 154 in position during the soldering operation. Each stop 148 will strike the stop ring 150 simultaneously as the respective type block 154 strikes a platen. Since the magnet 62 and its auxiliary poles are insulated from the remaining parts of the aligning device, a very strong magnetic effect is obtained to hold the received type block 154 in place.

It is to be understood that the foregoing description and the accompanying drawings have been given by way of illustration and example. It is also to be understood that changes in form of the several parts, substitution of equivalent elements and rearrangement of parts which will be readily apparent to one skilled in the art are contemplated as within the scope of the present invention, which is limited only by the claims which follow.

What is claimed is:

1. A type aligning device comprising a base, type block receiving means on the base including a pair of magnetically insulated members each adapted to receive a type character of a received type block, mechanical means including a member pivotally mounted on the base adapted for aligning a received type block laterally, mechanical means for aligning a received type block longitudinally including means movable longitudinally of and connected to said pivoted member adapted to move a received type block longitudinally, and means for holding a received type block in aligned position including a magnet disposed to effectuate said pair of magnetically insulated members as the two poles thereof and means on the base for receiving and holding a segmental assembly so that the type bars will properly engage the type blocks when the latter are aligned.

2. A type aligning device comprising a base, type block receiving means on the base including a pair of magnetically insulated members each adapted to receive a type character of a received type block, each of said members having a convex type character receiving surface of substantially the same degree of curvature as received type characters, means including a member pivotally mounted on the base adapted for aligning a received type block laterally, means for aligning a received type block longitudinally including means movable longitudinally of and connected to said pivoted member adapted to move a received type block longitudinally, and means for holding a received type block in aligned position including a magnet disposed to effectuate said pair of magnetically insulated members as the two poles thereof and means on the base for receiving and holding a segmental assembly so that the type bars will properly engage the type blocks when the latter are aligned.

3. A type aligning device comprising a base, means on the base for receiving and holding a type block including spaced magnetized elements insulated from each other, a member pivotally mounted on the base and including a slot adapted to receive and to align laterally a type block held by said receiving and holding means, a slide movable longitudinally of and connected to said pivoted member adapted to move a held type block longitudinally, a stop mounted on the base against which a type bar is moved, and means on the base for receiving and holding a segment assembly so that the type bars will properly engage the type blocks when the latter are aligned.

4. A type aligning device comprising a base, type block receiving means including a pair of spaced members magnetically insulated from each other and from the base, each of said members having a convex-shaped receiving surface of substantially the same curvature as a typewriter platen and adapted to receive a type character of a received type block, means including a member pivotally mounted on the base adapted for aligning a received type block laterally, means for aligning a received type block longitudinally including means movable longitudinally of and connected to said pivoted member adapted to move a received type block longitudinally, and means for holding a received type block in aligned position including a magnetized member disposed to effectuate said pair of magnetically insulated members as the two poles thereof and means on the base for receiving and holding a segmental assembly so that the type bars will properly engage the type blocks when the latter are aligned.

5. A type aligning device comprising a base, type block receiving means on the base including a pair of spaced members magnetically insulated from each other and from the base, each of said members having a convex-shaped receiving surface adapted to receive a type character of a received type block, a member pivotally mounted on the base and including a slot adapted to receive and to align laterally a type block supported by said receiving means, a slide movable longitudinally of and connected to said pivoted member adapted to move a received type block longitudinally, means for holding a received type block in aligned position including a magnetized member disposed to effectuate said pair of magnetically insulated members as the two poles thereof, and means on the base for receiving and holding a segment assembly so that the type bars will properly engage the type blocks when the latter are aligned.

6. A type aligning device, comprising a base; means on the base for receiving and yieldably holding a type block including spaced magnetized elements insulated from each other; an aligning member pivotally mounted on the base and including a slot to receive and laterally align a type block held by said receiving and holding means; a slide member slidably mounted on the aligning member for limited longitudinal movement relative thereto for moving a held type block longitudinally; yieldable means having one end fixed relative to the base urging the slide member away from a held type block; and means on the base for receiving and holding a segment assembly so that the type bars will properly engage the type blocks when the latter are aligned.

JOHN C. VELTMAN.
WILLIAM O. MICHELSEN.

REFERENCES CITED

The following references are of record in the file of this patent:

UNITED STATES PATENTS

| Number | Name | Date |
|---|---|---|
| 1,063,816 | McLaughlin | June 3, 1913 |
| 1,587,429 | Seib | June 1, 1926 |
| 1,751,761 | Rodrian | Mar. 25, 1930 |
| 1,886,257 | Brisbois | Nov. 1, 1932 |
| 1,890,659 | Thorell | Dec. 13, 1932 |
| 1,897,983 | Koca | Feb. 14, 1933 |
| 2,066,980 | Koca | Jan. 5, 1937 |
| 2,220,491 | Petz et al. | Nov. 5, 1940 |

FOREIGN PATENTS

| Number | Country | Date |
|---|---|---|
| 339,864 | Germany | Aug. 16, 1921 |
| 533,340 | Great Britain | Feb. 11, 1941 |